(12) United States Patent
Mullaly et al.

(10) Patent No.: US 6,195,640 B1
(45) Date of Patent: Feb. 27, 2001

(54) AUDIO READER

(75) Inventors: John Martin Mullaly, Austin, TX (US); Winslow Scott Burleson, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/240,500

(22) Filed: Jan. 29, 1999

(51) Int. Cl.[7] ............................................. G10L 13/08

(52) U.S. Cl. .......................... 704/260; 704/258; 345/156

(58) Field of Search .................................. 704/256, 257, 704/258, 260; 345/156, 157

(56) References Cited

U.S. PATENT DOCUMENTS

| | | | |
|---|---|---|---|
| 3,704,345 | * 11/1972 | Coker et al. ............................ | 704/260 |
| 5,731,805 | * 3/1998 | Tognazzini et al. .................... | 345/156 |
| 5,777,614 | * 7/1998 | Ando et al. ............................ | 704/260 |
| 5,886,683 | * 3/1999 | Tognazzini et al. .................... | 345/156 |
| 5,898,423 | * 4/1999 | Tognazzini et al. .................... | 345/158 |

OTHER PUBLICATIONS

"Eye Controlled Media: Present and Future State," Arne John Glenstrup and Theo Engell–Nielsen 1995 University of Copenhagen.

* cited by examiner

Primary Examiner—David R. Hudspeth
Assistant Examiner—Daniel Abebe
(74) Attorney, Agent, or Firm—Sawyer Law Group LLP; Leslie Van Leeuwen

(57) ABSTRACT

The present invention provides a method for allowing a user's reading to dictate the speed and position at which content is converted to audio in an audio reader. The method includes determining a position of a user's eye gaze, identifying a content displayed at the position of the user's eye gaze, determining an audio corresponding to the content, and outputting the audio. The method of the present invention allows the user's reading to drive the text to speech conversion, resulting in the computer reading what the user is currently reading. The user may then read text at a variable rate and at different positions, with the text to speech conversion following the user. The method of the present invention may be used to help raise users' literacy levels, to help users learn to read faster, to help boost reading comprehension, to help users scan documents, and to provide feedback for positioning and control. The present invention is thus flexible and has a range of utilities.

27 Claims, 4 Drawing Sheets

AUDIO READER

FIELD OF THE INVENTION

The present invention relates to audio readers, and more particularly to audio readers which allow the user's reading to dictate the speed and position at which the content is converted to audio.

BACKGROUND OF THE INVENTION

Many people learn information and concepts which are presented in auditory form, visually, or audio-visually. For example, information and concepts can be presented via written text, displays on a computer screen, and spoken words from an audio cassette. One such technology which exists is text to speech. Text to speech technology converts text inputted to a computer into speech. The user may then listen to the text instead, or in addition, to reading it. Such technology is helpful to visually impaired persons. An example of this technology is VIA VOICE, developed by International Business Machines Corporation. If the user wishes to simultaneously read and listen to the text, he may do so. However, with conventional text to speech technology, the text to speech system controls the speed and the position of what is read. Though the speed of the audio can be adjusted by users, it is a uniform setting. Likewise, the flow of the text converted to audio is linear and sequential from the top of the page to the bottom of the page. There is no way for users to control the audio reader according to their own reading of the text. The user may wish to read slower when difficult concepts are being portrayed or if the user is particularly interested in the portrayed information. The user may wish to read faster when familiar concepts are being portrayed or when the user wishes to only scan the information. The user may also wish to jump to different portions of the text, such as from the top of the page to the bottom of the page. But the user is not able to read in this manner with conventional text to speech methods. Thus, with the conventional text to speech technology, there is no ability to allow the user's reading to dictate the speed and position at which the text is converted to speech. The conventional method is thus inflexible and has utility limited to the simple speaking of text.

Accordingly, there exists a need for a method for allowing a user's reading to dictate the speed and position at which content is converted to audio in an audio reader. The method should be flexible and have a range of utilities. The present invention addresses such a need.

SUMMARY OF THE INVENTION

The present invention provides a method for allowing a user's reading to dictate the speed and position at which content is converted to audio in an audio reader. The method includes determining a position of a user's eye gaze, identifying a content displayed at the position of the user's eye gaze, determining an audio corresponding to the content, and outputting the audio. The method of the present invention allows the user's reading to drive the text to speech conversion, resulting in the computer reading what the user is currently reading. The user may then read text at a variable rate and at different positions, with the text to speech conversion following the user. The method of the present invention may be used to help raise users' literacy levels, to help users learn to read faster, to help boost reading comprehension, to help users scan documents, and to provide feedback for positioning and control. The present invention is thus flexible and has a range of utilities.

DETAILED DESCRIPTION

The present invention provides a method for allowing a user's reading to dictate the speed and position at which content is converted to audio in an audio reader. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 4 in conjunction with the discussion below.

Figure 1:
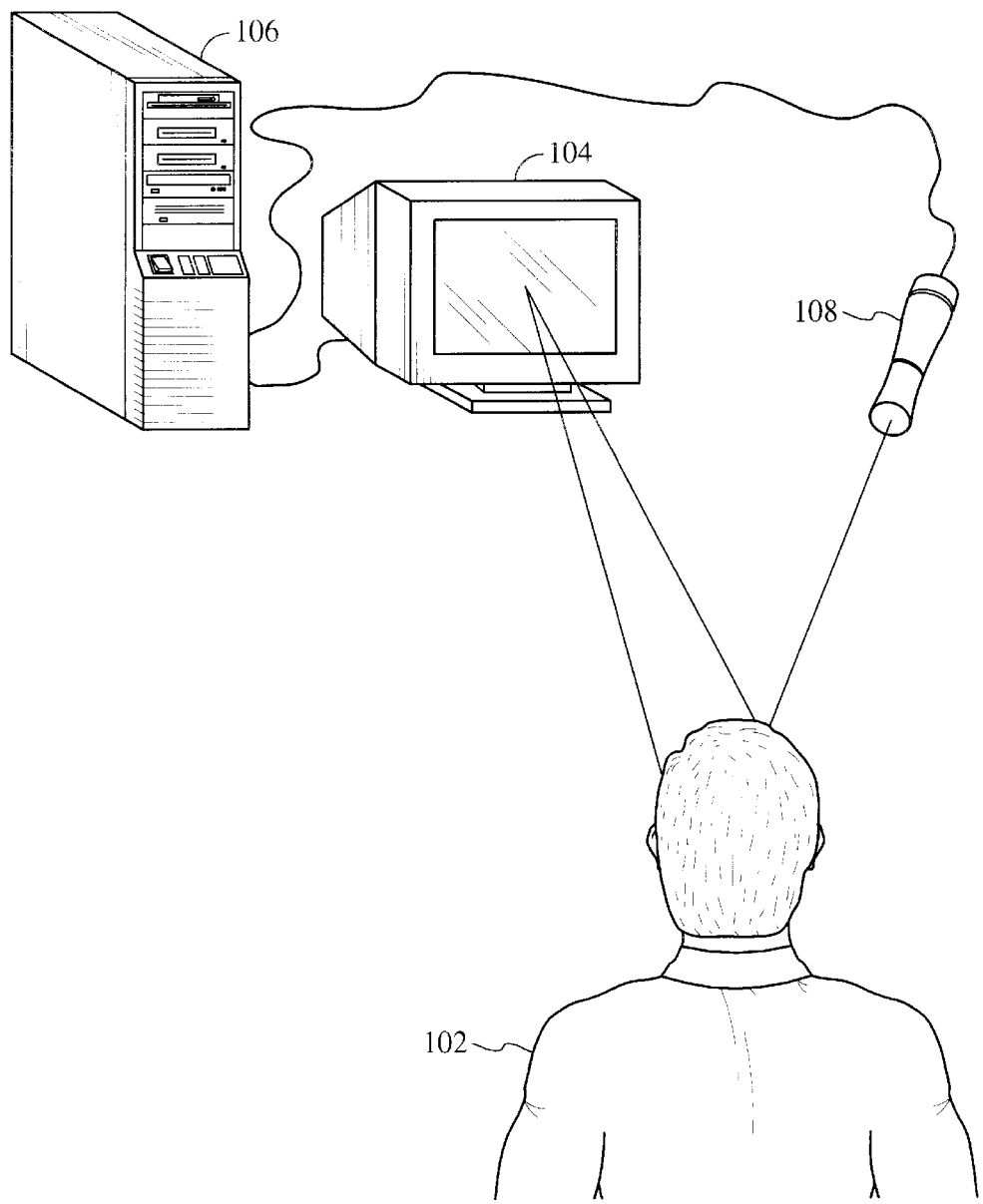
FIG. 1 illustrates the eye-tracking concept used in conventional eye-tracking techniques.

The present invention tracks a user's eye positions in cooperation with text to speech conversion to provide an eye-tracking driven audio reader in accordance with the present invention. FIG. 1 illustrates the eye tracking concept. FIG. 1 comprises a user 102 who is viewing a display on the display device 104, such as a computer monitor. The display device is connected to a computer 106. An eye gaze tracker 108 tracks the position of the user's eyes. An example of an eye-tracking system is GAZETRACKER, developed by Mooij & Associates. The position of the user's eyes are then sent to the computer 106 which contains software which computes the point on the display at which the user 102 is gazing.

Figure 2:
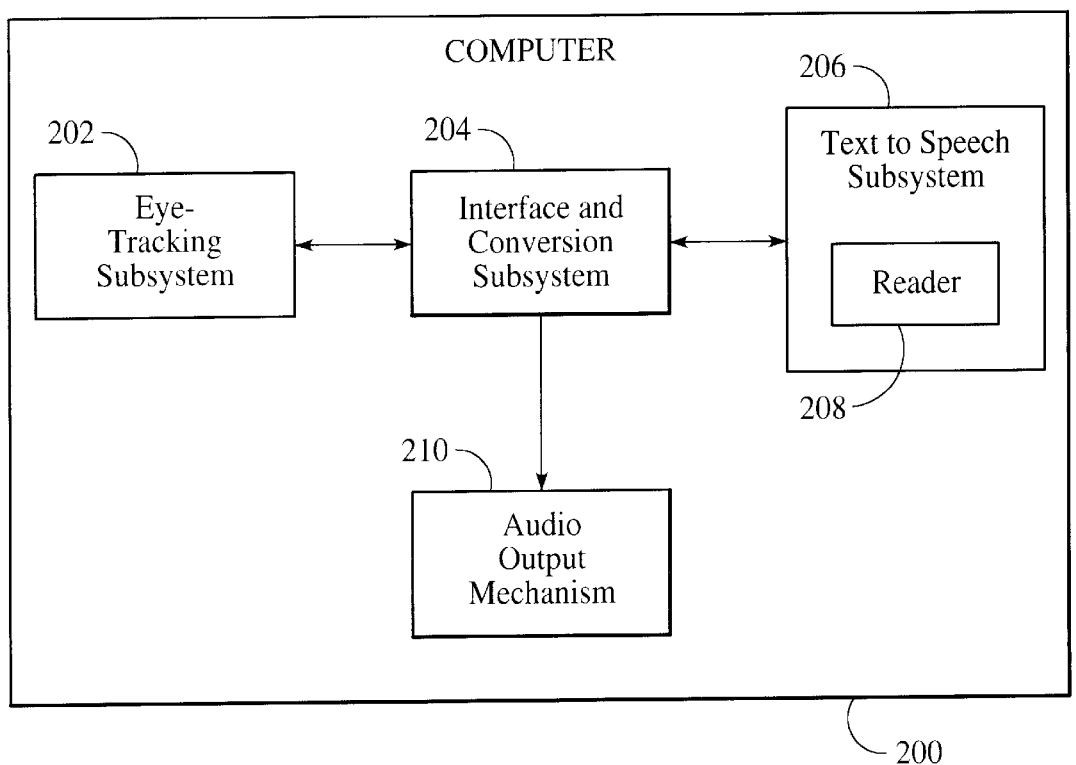
FIG. 2 illustrates a preferred embodiment of a computer which uses the method in accordance with the present invention.

FIG. 2 illustrates a computer 200 which utilizes the method of the present invention. The computer 200 comprises an eye-tracking subsystem 202, which contains the reader 208 of the present invention. The reader 208 contains conventional eye-tracking software which performs conventional eye-tracking as illustrated in FIG. 1. It also comprises a text to speech subsystem 206 which contains conventional text to speech software, such as that which may be found in VIA VOICE. The eye-tracking subsystem 202 and the text to speech subsystem 206 are both coupled to an interface and conversion subsystem 204.

The interface and conversion subsystem 204 contains software which obtains the user's current eye position via the eye-tracking subsystem 202, determines the corresponding text displayed at that position by the reader 208, and converts this text to audio via the text to speech subsystem 206. The audio is then outputted via the audio output mechanism 210, such as computer audio speakers. The same process is repeated for each position of the user's eye. Thus, a text is converted to audio in response to the user reading the text. In this manner, the user's reading drives the text to speech conversion, resulting in the computer speaking what the user is currently reading. The user may then read text with a variable rate and at different positions, with the text to speech conversion following the user.

Figure 3:
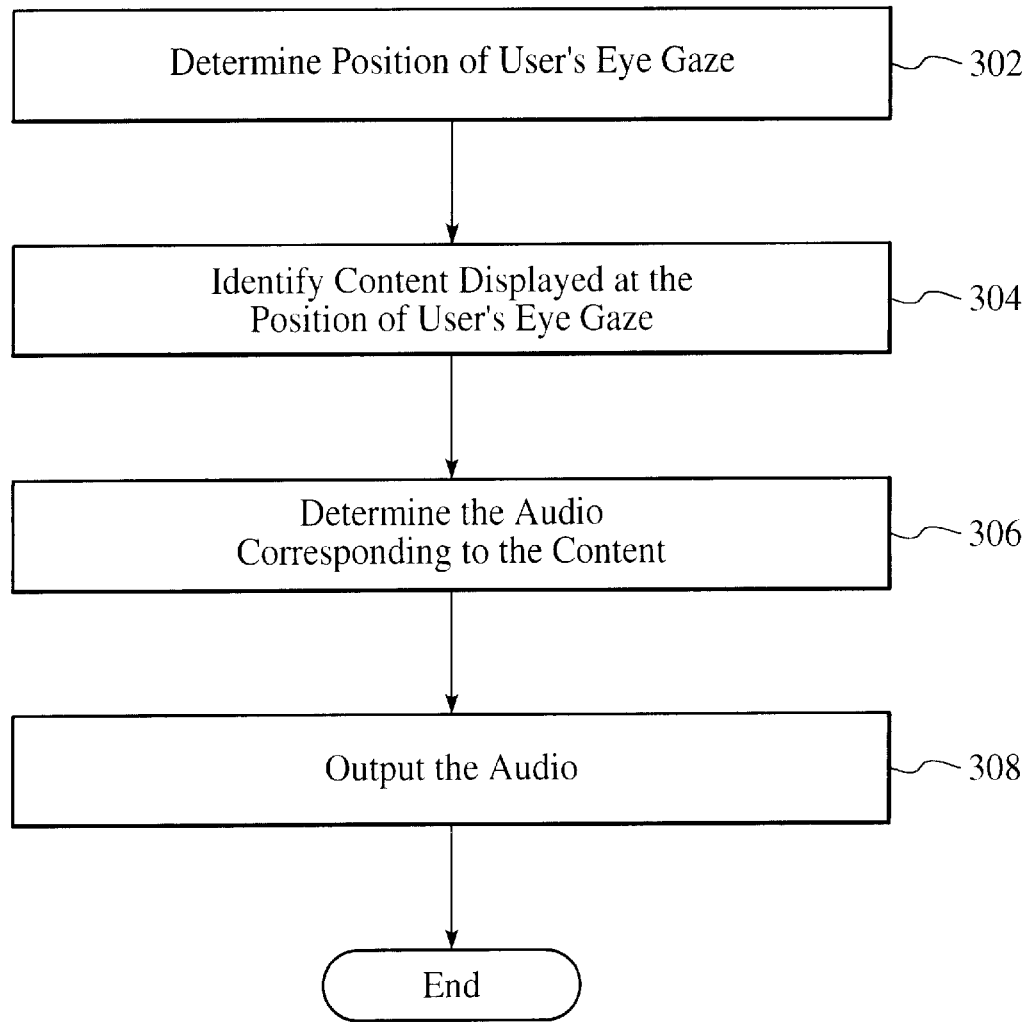
FIG. 3 is a flow chart illustrating a preferred embodiment of the method for providing an eye-tracking driven audio reader in accordance with the present invention.

FIG. 3 is a flow chart illustrating a preferred embodiment of the method for providing an eye-tracking driven audio reader in accordance with the present invention. First, the position of the user's eye gaze is determined by the eye-tracking subsystem 202 (FIG. 2), via step 302. Next, the content displayed on the display device at the position of the user's eye gaze is identified by the interface and conversion subsystem 204, via step 304. Next, the audio corresponding to the content is determined by the text to speech subsystem 206, via step 306. This audio is then outputted through the audio output mechanism 210, via step 308.

In the preferred embodiment, the content is text, and this text is converted to audio, and this audio which corresponds to the content is outputted. But one of ordinary skill in the art will understand that other types of audio may be used without departing from the spirit and scope of the present invention. For example, prerecorded audio files which correspond to the content may be accessed and outputted. Prerecorded audio files include files which provide audio augmentation. For example, actors' voices may be outputted when the user is reading a play, or sound effects may be outputted to reflect the environment put forth by the content the user is reading.

Figure 4:
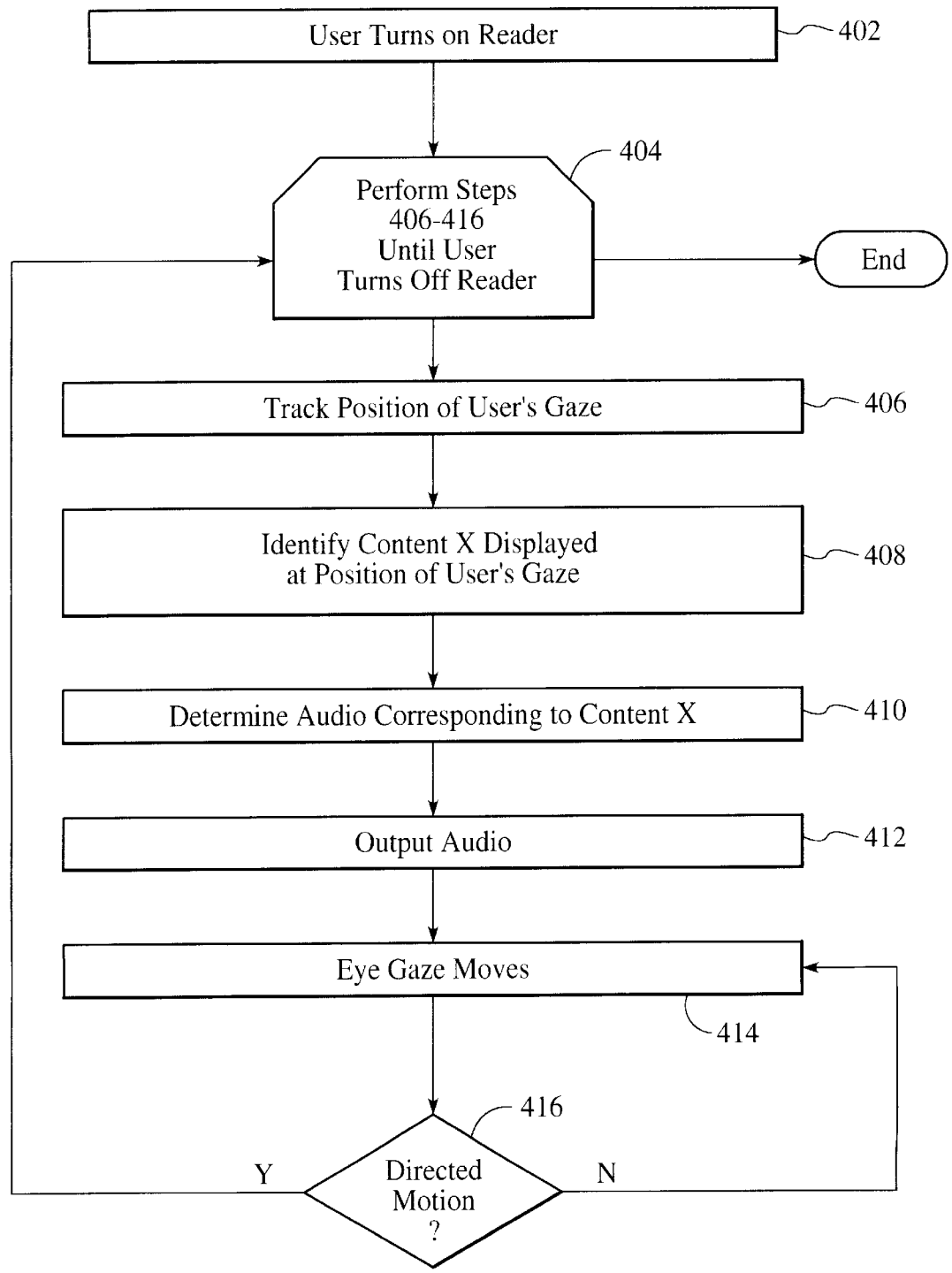
FIG. 4 is a flow chart illustrating in more detail the preferred embodiment of the method for providing an eye-tracking driven audio reader in accordance with the present invention.

FIG. 4 is a flow chart illustrating in more detail the preferred embodiment of the method for providing an eye-tracking driven audio reader in accordance with the present invention. First, the user turns on the reader 208 of the present invention, via step 402. In turning on the reader 208, the eye-tracking subsystem 202 and the text to speech subsystem are initialized. The steps 406–416 are repeated until the user turns off the reader 208, via step 404. The position of the user's gaze is tracked by the eye-tracking subsystem 202, via step 406. The content "X" displayed on the display device at the position of the user's gaze is identified by the interface and conversion subsystem 204, via step 408. Next, the audio corresponding to the content "X" is determined by the text to speech subsystem 206, via step 410. The audio is then outputted through the audio output mechanism 210, via step 412. When the user's eye gaze moves, via step 414, it is determined if the motion is directed motion, via step 416.

Directed motion refers to a motion by the user's eye which is directed to content displayed on the display device. The human eye often makes numerous extraneous eye movements which are not directed to the content displayed. Conventional eye-tracking techniques include methods of determining if an eye gaze move is most likely a directed motion. These methods are well known in the art and will not be discussed in detail here.

If the eye gaze move is determined not to be a directed motion, via step 416, then the movement is ignored and the reader 208 returns to step 414 and waits for the next eye gaze move. If the eye gaze move is determined to be a directed motion, via step 416, then the reader 208 returns to step 404 and tracks the new position of the user's gaze. Steps 408 through 412 are then repeated for this new position. These same steps are performed for each eye gaze move. When the user wishes to stop reading, the user turns off the reader, via step 404.

The method of the present invention illustrated in FIGS. 3 and 4 may be used to assist those who read at a low literacy level. Simultaneously reading and hearing the text being spoken may help them to raise their literacy level. The method may be used to assist users in learning to speed read by setting the text to speech software to speak the text quickly, pushing the user to read faster. The method may be used to help users scan documents with acoustical back up of the visually presented text. The method may also be used to boost reading comprehension with auditory reinforcement of what the user is reading. The speed of the text to speech software may be adjusted to either lag behind the user's reading or anticipate the user's reading. By lagging, the user may be forced to read slower which may boost reading comprehension. By anticipating, the user may be forced to read faster, boosting reading speed. The method of the present invention may also be used to provide feedback for positioning and control. For example, a "send" button is tagged with a corresponding audio of "send". When a user is looking at the "send" button, the audio of "send" is outputted, giving the user feedback that the eye-tracking subsystem determines that he/she is looking at the "send" button.

A method for providing an eye-tracking driven audio reader has been provided. The method of the present invention allows the user's reading to drive the text to speech conversion, resulting in the computer reading what the user is currently reading. The user may then read text at a variable rate and at different positions, with the text to speech conversion following the user. The method of the present invention may be used to help raise users' literacy levels, to help users learn to speed read, to help users scan documents, and to provide feedback for positioning and control. The present invention is thus flexible and has a range of utilities.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for allowing a user's reading speed to dictate the speed at which content is converted to audio in an audio reader, comprising the steps of:
    (a) determining a position of a user's eye gaze;
    (b) identifying a text displayed at the position of the user's eye gaze;
    (c) converting the text to audio at a speed based upon the user's reading speed; and
    (d) outputting the audio.

2. The method of claim 1, wherein the audio comprises speech.

3. The method of claim 1, wherein the determining step (a) comprises:
    (a1) tracking the position of the user's eye gaze utilizing an eye-tracking subsystem.

4. The method of claim 1, wherein the converting step (c) comprises:
    (c1) converting the text to audio utilizing a text to speech subsystem.

5. The method of claim 1, wherein the converting step (c) comprises:
    (c1) identifying a prerecorded audio file corresponding to the text utilizing a text to speech subsystem.

6. The method of claim 1, further comprising:
    (e) detecting a first change in the position of the user's eye gaze;

(f) determining if the first change is directed motion; and (g) repeating steps (a) through (d) if the first change is directed motion.

7. The method of claim 6, further comprising:

(h) waiting for a second change in the position of the user's eye gaze if the first change is not a directed motion.

8. An audio reader, comprising:

a display device displaying a plurality of texts;

an audio output device; and a computer coupled to the display device and the audio output device, wherein the computer comprises
means for determining a position of a user's eye gaze,
means for identifying a text of the plurality of texts displayed on the display device at the position of the user's eye gaze, and
means for converting the text to audio at a speed based upon a user's reading speed, wherein the audio is outputted utilizing the audio output device.

9. The audio reader of claim 8, wherein the audio comprises speech.

10. The audio reader of claim 8, wherein the means for determining a position of a user's eye gaze comprises:

means for tracking the position of the user's eye gaze utilizing an eye-tracking subsystem.

11. The audio reader of claim 8, wherein the converting means comprises:

means for converting the text to audio utilizing a text to speech subsystem.

12. The audio reader of claim 8, wherein the converting means comprises:

means for identifying a prerecorded audio file corresponding to the content utilizing a text to speech subsystem.

13. The audio reader of claim 8, wherein the computer further comprises:

means for detecting a first change in the position of the user's eye gaze; and means for determining if the first change is directed motion, wherein the determining means, identifying means, and converting means are utilized if the first change is directed motion.

14. The audio reader of claim 13, further comprising:

means for waiting for a second change in the position of the user's eye gaze if the first change is not a directed motion.

15. A method for allowing a user's reading speed to dictate the speed at which content is converted to audio in an audio reader, comprising the steps of:

(a) tracking a position of a user's eye gaze utilizing an eye-tracking subsystem;

(b) identifying a text displayed at the position of the user's eye gaze;

(c) converting the text to audio at a speed based upon the user's reading speed utilizing a text to speech subsystem; and (d) outputting the audio.

16. The method of claim 15, wherein the audio comprises speech.

17. The method of claim 15, further comprising:

(e) detecting a first change in the position of the user's eye gaze;

(f) determining if the first change is directed motion; and (g) repeating steps (a) through (d) if the first change is directed motion.

18. The method of claim 17, further comprising:

(h) waiting for a second change in the position of the user's eye gaze if the first change is not a directed motion.

19. An audio reader, comprising:

a display device displaying a plurality of texts;

an audio output device; and a computer coupled to the display device and the audio output device, wherein the computer comprises
an eye-tracking subsystem for tracking a position of the user's eye gaze,
an interface and converting subsystem for identifying a text of the plurality of texts displayed on the display device at the position of the user's eye gaze, and
a text to speech subsystem for converting the text to audio at a speed based upon a user's reading speed, wherein the audio is outputted utilizing the audio output device.

20. The audio reader of claim 19, wherein the audio comprises speech.

21. The audio reader of claim 19, wherein the computer further comprises:

means for detecting a first change in the position of the user's eye gaze;

means for determining if the first change is directed motion, wherein the determining means, identifying means, and converting means are utilized if the first change is directed motion.

22. The audio reader of claim 21, further comprising:

means for waiting for a second change in the position of the user's eye gaze if the first change is not a directed motion.

23. A method for allowing a user's reading speed to dictate the speed at which content is converted to audio in an audio reader, comprising the steps of:

(a) tracking a position of a user's eye gaze utilizing an eye-tracking subsystem;

(b) identifying a text displayed at the position of the user's eye gaze;

(c) converting the text to audio at a speed based upon the user's reading speed utilizing a text to speech subsystem;

(d) outputting the audio;

(e) detecting a first change in the position of the user's eye gaze;

(f) determining if the first change is directed motion; and (g) repeating steps (a) through (d) if the first change is directed motion.

24. The method of claim 23, further comprising:

(h) waiting for a second change in the position of the user's eye gaze if the first change is not a directed motion.

25. An audio reader, comprising:

a display device displaying a plurality of texts;

an audio output device; and a computer coupled to the display device and the audio output device, wherein the computer comprises
an eye-tracking subsystem for tracking a position of the user's eye gaze,
an interface and converting subsystem for identifying a text of the plurality of texts displayed on the display device at the position of the user's eye gaze,
a text to speech subsystem for converting the text to audio at a speed based upon the user's reading speed, wherein the audio is outputted utilizing the audio output device, means for detecting a first change in the position of the user's eye gaze, and means for determining if the first change is directed motion, wherein the eye-tracking subsystem and the text to speech subsystem, and the interface and converting subsystem are utilized if the first change is directed motion.

26. The audio reader of claim 25, further comprising:

means for waiting for a second change in the position of the user's eye gaze if the first change is not a directed motion.

27. A computer readable medium with computer instructions for allowing a user's reading speed to dictate the speed at which content is converted to audio in an audio reader, the computer instructions for:

(a) determining a position of a user's eye gaze;

(b) identifying a text displayed at the position of the user's eye gaze;

(c) converting the text to audio at a speed based upon the user's reading speed; and (d) outputting the audio.

* * * * *